United States Patent
Yefet et al.

(10) Patent No.: US 11,451,493 B2
(45) Date of Patent: Sep. 20, 2022

(54) CONNECTION MANAGEMENT IN A NETWORK ADAPTER

(71) Applicant: MELLANOX TECHNOLOGIES, LTD., Yokneam (IL)

(72) Inventors: Gal Yefet, Haifa (IL); Daniel Marcovitch, Yokneam Illit (IL); Roee Moyal, Yokneam Illit (IL); Ariel Shahar, Jerusalem (IL); Gil Bloch, Zichron Yaakov (IL); Lior Narkis, Petah-Tikva (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 17/142,366

(22) Filed: Jan. 6, 2021

(65) Prior Publication Data

US 2022/0217101 A1 Jul. 7, 2022

(51) Int. Cl.
*H04N 21/238* (2011.01)
*H04L 49/901* (2022.01)
*H04L 41/0604* (2022.01)
*H04L 49/253* (2022.01)
*H04L 49/9005* (2022.01)

(52) U.S. Cl.
CPC ........ *H04L 49/901* (2013.01); *H04L 41/0627* (2013.01); *H04L 49/253* (2013.01); *H04L 49/9005* (2013.01)

(58) Field of Classification Search
CPC . H04L 49/901; H04L 41/0627; H04L 49/253; H04L 49/9005
See application file for complete search history.

(56) References Cited

U.S. PATENT DOCUMENTS

| | | | | |
|---|---|---|---|---|
| 5,970,069 A * | 10/1999 | Kumar | ............ | H04L 69/12 370/401 |
| 8,213,315 B2 * | 7/2012 | Crupnicoff | ............ | H04L 67/14 370/236 |
| 8,761,189 B2 * | 6/2014 | Shachar | ............ | H04L 47/10 370/419 |
| 8,811,417 B2 * | 8/2014 | Bloch | ............ | H04L 67/10 370/412 |
| 10,305,772 B2 * | 5/2019 | Zur | ............ | H04L 69/30 |
| 10,623,521 B2 * | 4/2020 | Shuler | ............ | H04L 67/32 |
| 2011/0116512 A1 * | 5/2011 | Crupnicoff | ............ | H04L 67/14 370/463 |

(Continued)

OTHER PUBLICATIONS

Infiniband Trade Association, "InfiniBand™ Architecture Specification", vol. 1, Release 1.3, pp. 1-1842, Mar. 3, 2015.
EP Application # 22150387.3 Search Report dated Jun. 8, 2022.

*Primary Examiner* — Abdelnabi O Musa
(74) *Attorney, Agent, or Firm* — Kligler & Associates Patent Attorneys Ltd

(57) ABSTRACT

A network adapter includes a network interface, a host interface and processing circuitry. The network interface connects to a communication network for communicating with remote targets. The host interface connects to a host that accesses a Multi-Channel Send Queue (MCSQ) storing Work Requests (WRs) originating from client processes running on the host. The processing circuitry is configured to retrieve WRs from the MCSQ and distribute the WRs among multiple Send Queues (SQs) accessible by the processing circuitry.

37 Claims, 4 Drawing Sheets

(56) References Cited

U.S. PATENT DOCUMENTS

| | | | |
|---|---|---|---|
| 2014/0003441 A1* | 1/2014 | Shachar | H04L 5/0055 |
| | | | 370/401 |
| 2014/0310369 A1 | 10/2014 | Makhervaks | |
| 2015/0269116 A1* | 9/2015 | Raikin | F01N 3/103 |
| | | | 709/212 |
| 2016/0065659 A1* | 3/2016 | Bloch | H04L 67/10 |
| | | | 709/201 |
| 2017/0346742 A1* | 11/2017 | Shahar | H04L 41/22 |
| 2020/0259759 A1 | 8/2020 | Shalev | |

* cited by examiner

CONNECTION MANAGEMENT IN A NETWORK ADAPTER

TECHNICAL FIELD

Embodiments described herein relate generally to data communication, and particularly to methods and systems for connection management in a network adapter.

BACKGROUND

InfiniBand™ (IB) is a switched-fabric communications architecture primarily used in high-performance computing. It has been standardized by the InfiniBand Trade Association. Computing devices (host processors and peripherals) connect to the IB fabric via a network adapter such as a Network Interface Controller (NIC). IB defines both a layered hardware protocol (physical, link, network, and transport layers) and a software layer, which manages initialization and communication between devices. The transport layer is responsible for in-order packet delivery, partitioning, channel multiplexing and transport services, as well as data segmentation when sending and reassembly when receiving.

Methods for communication using Reliable Connection (RC) and Dynamically Connected (DC) transport services are known in the art. For example, U.S. Pat. No. 8,213,315 describes a method of communication that includes receiving, in a network interface device, first and second requests from an initiator process running on an initiator host to transmit, respectively, first and second data to first and second target processes running on one or more target nodes, via a packet network. A single dynamically connected initiator context is allocated for serving both the first and second requests. A first connect packet referencing the dynamically connected (DC) initiator context is directed to the first target process so as to open a first dynamic connection with the first target process, followed by transmission of the first data over the first dynamic connection. The first dynamic connection is closed after the transmission of the first data, and a second connect packet is transmitted so as to open a second dynamic connection with the second target process, followed by transmission of the second data.

U.S. Pat. No. 8,761,189 describes a method for communication that includes allocating, in a network interface controller (NIC) a single dynamically connected (DC) initiator context for serving requests from an initiator process running on the initiator host to transmit data to multiple target processes running on one or more target nodes. The NIC transmits a first connect packet directed to a first target process and referencing the DC initiator context so as to open a first dynamic connection with the first target process. The NIC receives over the packet network, in response to the first connect packet, a first acknowledgment packet containing a first session identifier (ID). Following receipt of the first acknowledgment packet, the NIC transmits one or more first data packets containing the first session ID over the first dynamic connection from the NIC to the first target process. Dynamic connections with other target processes may subsequently be handled in similar fashion.

SUMMARY

An embodiment that is describe herein provides a network adapter that includes a network interface, a host interface and processing circuitry. The network interface is configured to connect to a communication network for communicating with remote targets. The host interface is configured to connect to a host that accesses a Multi-Channel Send Queue (MCSQ) storing Work Requests (WRs) originating from client processes running on the host. The processing circuitry is configured to retrieve WRs from the MCSQ and distribute the retrieved WRs among multiple Send Queues (SQs) accessible by the processing circuitry.

In some embodiments, each of the targets includes (i) a remote node coupled to the communication network or (ii) a local device coupled to the host. In other embodiments, the WRs comprise respective identifiers associated with respective SQs, and the processing circuitry is configured to distribute the WRs among the SQs based on the identifiers. In yet other embodiments, the processing circuitry is configured to, in response to detecting that the identifier in a retrieved WR has no associated SQ among the SQs, select an available SQ among the multiple SQs, to associate the identifier with the available SQ, and to post the WR on the available SQ.

In an embodiment, the processing circuitry is configured to, in response to detecting that the identifier in a given WR is associated with a selected SQ, post the WR on the selected SQ. In another embodiment, the processing circuitry is configured to operate the SQs in accordance with a Reliable-Connection (RC) protocol in which the SQs are assigned to connect persistently to respective targets. In yet another embodiment, the processing circuitry is configured to operate the SQs in accordance with a Dynamically Connected (DC) protocol, which allows a given SQ to connect to different targets at different times.

In some embodiments, the host posts WRs on a first and second MCSQs associated respectively with first and second pools of SQs, and the processing circuitry is configured to distribute WRs from the first MCSQ to SQs in the first pool, and to distribute WRs from the second MCSQ to SQs of the second pool. In other embodiments, at least one SQ is shared among the first and second pools, and the processing circuitry is configured to post WRs from both the first and the second MCSQs to the at least one SQ. In yet other embodiments, the processing circuitry is configured to post on a (Completion Queue) CQ accessible by the client processes a Completion Queue Element (CQE) indicative of concluding execution of a given WR, after posting on the CQ all CQEs corresponding to WRs posted to the MCSQ before the given WR.

In an embodiment, the processing circuitry is configured to post CQEs to a CQ independently of an order of respective WRs in the MCSQ. In another embodiment, the processing circuitry is configured to distribute to a given SQ that has established a connection with a given target, only WRs specifying the given target, until the connection terminates. In yet another embodiment, the processing circuitry is configured to, in response to detecting a failure in a given SQ, post on a CQ a CQE indicative of the failure.

In some embodiments, the processing circuitry is configured to post on the CQ a CQE indicative of the failure for each WR that is to be executed in the given SQ. In other embodiments, the processing circuitry is configured to post on the CQ a CQE indicative of the failure for each WR from the MCSQ that is to be distributed to the given SQ. In yet other embodiments, at least a given WR specifies a respective data transmission operation from the host to a target. In yet further other embodiments, at least a given WR specifies a locally executed operation.

There is additionally provided, in accordance with an embodiment that is described herein, a method for communication, including, in a network adapter that connects to a communication network for communicating with remote targets, and further connects to a host that accesses a MCSQ storing Work Requests (WRs) originating from client processes running on the host, retrieving WRs from the MCSQ and distributing the retrieved WRs among multiple Send Queues (SQs) accessible by the processing circuitry.

These and other embodiments will be more fully understood from the following detailed description of the embodiments thereof, taken together with the drawings in which:

DETAILED DESCRIPTION OF EMBODIMENTS

Overview

Figure 1:
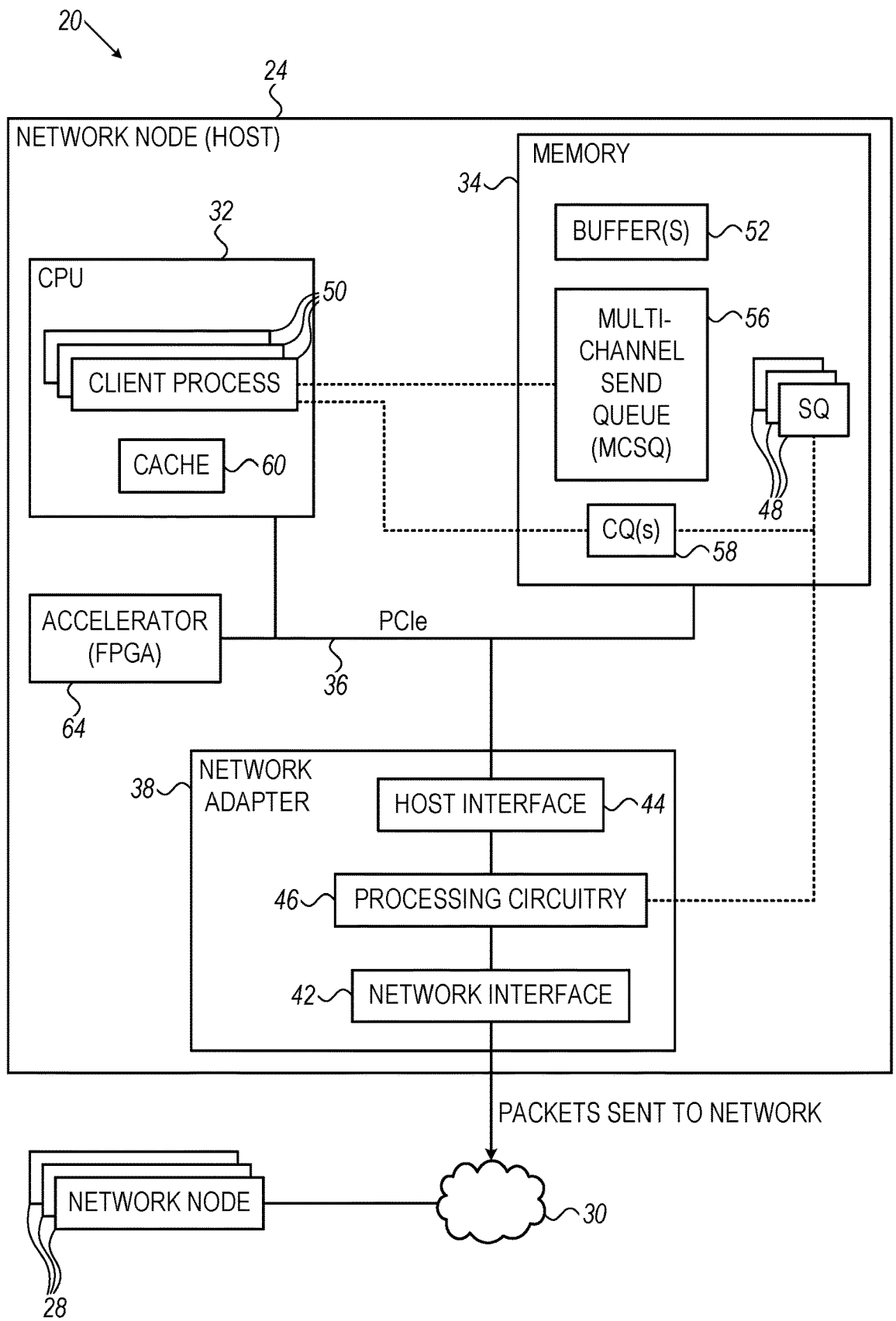
FIG. 1 is a block diagram that schematically illustrates a computing system, in which a network adapter manages for a host communication over multiple channels, in accordance with an embodiment that is described herein.

Embodiments that are described herein provide methods and systems for offloading communication management over multiple channels to a network adapter.

In various applications such as datacenters and High-Performance Computing (HPC), a host runs client processes that communicate with a large number of targets. The host typically comprises a network adapter for communicating with remote nodes over a packet network. The network adapter typically executes Work Requests (WRs) posted on one or more work queues that are connected via the communication network to targets. A work queue used for data transmission is referred to as a Send Queue (SQ), whereas a wok queue used for data reception is referred to as a Receive Queue (RQ). The WRs specify data transfer operations required, e.g., by client processes running on the host. The network adapter notifies the completion of a WR by posting a Completion Queue Element (CQE) on a Completion Queue (CQ) accessible by the host.

In principle, the host could handle multi-channel communication using a software program running on a Central Processing Unit (CPU) of the host. Such a software program that manages multiple SQs may comprise, for example, a program or a combination of multiple programs such as client processes, a communication stack and a driver that mediates between the host and network adapter. A software program of this sort repeatedly checks which WRs have completed and posts other outstanding WRs in a desired order. Although the disclosure below refers mainly to a host implemented using a CPU, the disclosed embodiments are similarly applicable using any other suitable processing unit implementing the host, such as, for example, a Graphics Processing Unit (GPU).

Managing multiple SQs in software may be disadvantageous for various reasons. For one, the software program may consume CPU cycles in executing tasks such as balancing workload among the multiple SQs and polling CQs. These CPU cycles could be otherwise used for executing non-communication operations, e.g., computation operations. The software program also typically consumes considerable bandwidth for communication between the host and network adapter, e.g., over the underlying bus, e.g., a Peripheral Component Interconnect Express (PCIe) bus. Moreover, managing a large number of SQs in software requires considerable storage space, and may result in poor caching performance of a cache of the host CPU.

The description that follows refers mainly to transport services and protocols referred to as Reliable Connection (RC) and Dynamically Connected (DC). Other suitable transport services or protocols such as the Transmission Control Protocol (TCP) are also applicable.

In the RC protocol, the connections are persistence and occupy respective SQs for long time periods. The RC protocol is therefore suitable for applications that require low to medium scalability. Unlike the persistence nature of RC, SQs configured to the DC protocol are used on demand, and are disconnected when a data transfer operation is done. A given DC SQ may thus connect to different targets at different times.

In executing a WR specifying a data transmission operation, the network adapter typically transmits the data in multiple packets, wherein for each transmitted packet, the network adapter receives an Acknowledgement (Ack) notification from the target. In the DC protocol, a connection is disconnected and becomes available for connecting to another target only after receiving an Ack for the last packet of the current data transfer. In some embodiments, the network adapter utilizes the time gap between transmitting the last packet and disconnection, by handling communication via one or more other connections using other DC SQs. As one example, the CPU may apply hash-based scheduling, in which case WRs are posted on DC SQs by applying a suitable static hash function, e.g., to the target address specified in the WR. Hashed-based scheduling may, however, result in imbalanced workload among the DC SQs. As another example, the CPU may post WRs associated with a common flow on the same DC SQ. If no DC SQ is available, the CPU waits until some DC SQ is freed. In this scheme the software operates in async progress mode, which imposes burden on the CPU.

In the disclosed embodiments, the network adapter offloads the host software from the burden of managing multiple channels. To this end, the host software program posts WRs destined to multiple targets on a common Multi-Channel SEND Queue (MCSQ). The network adapter retrieves WRs from the MCSQ and distributes them among SQs connected to relevant targets. Specifically, when a connection to the target is already set for the SQ, it will be used. Otherwise, the network adapter allocates a new connection context, connects to the remote peer using the context, and sends the data to the remote peer over the established connection. The network adapter also posts CQEs to a common CQ that is accessible by the host software program.

In some embodiments, instead of storing WRs in a queue, the SQ has a small storage space for referencing WRs in the MCSQ, e.g., pointers to the WRs. Therefore, the SQs handled by the network adapter require much less storage space than SQs having full queues as typically handled in software.

Next, we focus on embodiments that relate mainly to the network adapter. Consider a network adapter comprising a network interface, a host interface and processing circuitry.

The network interface connects to a communication network for communicating with remote targets. The host interface connects to a host that accesses a MCSQ storing WRs originating from client processes running on the host, wherein at least a given WR specifies a respective data transmission operation from the host to a target. Alternatively or additionally, at least a given WR specifies an operation locally executed by the network adapter, e.g., a memory registration operation. The processing circuitry retrieves WRs from the MCSQ and distributes the retrieved WRs among multiple SQs accessible by the processing circuitry. In the present context, the operation of distributing a WR to a SQ means that information for accessing that WR in the MCSQ is provided for storage in the SQ. A WR whose accessing information is thus distributed and stored for the SQ is referred to herein as a WR posted on the SQ. The processing circuitry schedules execution of the WRs posted on the multiple SQs, and posts CQEs on a CQ accessible by the client processes, wherein each CQE is indicative of concluding execution of one or more WRs.

Each of the targets with which the host communicates may comprise (i) a remote node coupled to the communication network or (ii) a local device coupled to the host, such as a hardware accelerator.

For distributing the WRs from the MCSQ to the SQs, the WRs comprise respective identifiers associated with the respective SQs, and the processing circuitry distributes the WRs among the SQs based on the identifiers. The network adapter may retrieve from the MCSQ a WR to which no SQ has yet been assigned. In this case, the processing circuitry selects an available SQ among the multiple SQs, associates the identifier with the available SQ, and posts the WR on the available SQ. In response to detecting that the identifier in a given WR is already associated with a selected SQ, the processing circuitry posts the WR on the selected SQ. In some embodiments, the association between WRs and SQs in based on target address and network state.

In the disclosed embodiments, some transport contexts may use the RC protocol, while others may use the DC protocol or the User Datagram Protocol (UDP). Association of a WR with a SQ may be carried out by selecting a specific type of a transport context. Alternatively, the network adapter may select the best available type of a transport context at execution time.

In an embodiment, the host posts WRs on first and second MCSQs associated respectively with first and second SQ pools. In this embodiment the processing circuitry distributes WRs from the first MCSQ to SQs in the first pool and distributes WRs from the second MCSQ to SQs of the second pool. The SQ pools may be disjoint, or alternatively, at least one SQ is shared among the first and second SQ pools. In this case, the processing circuitry posts WRs from both the first and the second MCSQs to the at least one SQ.

The network adapter executes WRs posted to the same SQ in the posting order, but typically does not guarantee execution order of WRs posted on different SQs to match the same order in which the WRs were posted to the MCSQ.

To execute WRs in the same order they were posted on the MCSQ, these WRs should be posted on the same SQ. To post CQEs in the same order in which the corresponding WRs were posted on the MCSQ, the processing circuitry posts on the CQ a CQE corresponding to a given WR, after posting on the CQ all CQEs corresponding to WRs posted to the MCSQ before the given WR. Alternatively, in case out of order execution is allowed, the processing circuitry posts CQEs on the CQ independently of an order of respective WRs in the MCSQ.

In some embodiments, between connection establishment and termination, a DC SQ serves WRs specifying a common target. In such embodiments, the processing circuitry distributes to a given SQ that has established a connection with a RQ of a given target, only WRs specifying the given target, until the connection terminates.

A connection using a SQ may fail for various reasons such as transport retry count exceeded, Retry Receiver Not Ready (RNR) Negative Acknowledgement (NACK) retry count exceeded, remote access error and remote operation error. When a connection fails, the network adapter cannot execute WRs posted on the corresponding SQ and therefore does not post corresponding CQEs on the CQ. This, in turn, may cause suspension of retrieving from the MCSQ WRs destined to other connections using other SQs. In some embodiments, the network adapter suspends execution of WRs associated with a failing connection but keeps executing WRs of active connections. Specifically, in response to detecting a failure in a given SQ, the processing circuitry posts on a CQ a CQE indicative of the failure. For example, the processing circuitry is configured to post on the CQ a CQE indicative of the failure for each WR that is to be executed in the given SQ. As another example, the processing circuitry is configured to post on the CQ a CQE for each WR from the MCSQ that is to be distributed to the given SQ.

The host software identifies the CQs of the failing connection and acts accordingly, e.g., by removing the corresponding WRs from the MCSQ. In some embodiments, the host CPU attempts correcting the error, e.g., by restarting the session or applying other suitable corrective actions. After the error has been corrected, the host CPU drains the remaining WRs, and reposts them starting from the last WR that was executed successfully.

In the disclosed techniques, a network adapter offloads the management of multi-channel connections from the host. The host thus posts WRs specifying multiple different targets possibly using different transport services on a common MCSQ. The network adapter distributes the WRs among multiple SQs that are connected to the targets and posts completion notifications on a common completion queue, without involving the host CPU. Using this scheme, CPU cycles that would otherwise be used for communication management are freed, e.g., for computation tasks. By using a common multi-channel queue (the MCSQ work queue), storage space is reduced significantly, compared to using individual work queues. Moreover, the disclosed embodiments, improve CPU cache performance.

System Description

FIG. 1 is a block diagram that schematically illustrates a computing system 20, in which a network adapter manages for a host communication over multiple channels, in accordance with an embodiment that is described herein.

In computing system 20, a network node 24 communicates with remote network nodes 28 over a communication network 30. Communication network 30 may comprise any suitable packet network such as, for example, an Ethernet network or the InfiniBand™ (IB) fabric.

Computing system 20 may be used, for example, in applications in which a network node exchanges large amounts of data with other network nodes, such as, for example, High-Performance Computing (HPC), distributed computing and data centers, to name a few.

Network node 24 comprises a processor, in the form of a Central Processing Unit (CPU) 32, and a memory 34, which are interconnected by a suitable bus 36. In the present example bus 36 comprises a Peripheral Component Interconnect Express (PCIe) bus. Alternatively, other suitable bus types can also be used. Network node 24 further comprises a network adapter 38 for connecting to communication network 30, such as a Network Interface Controller (NIC). The combination of CPU 32, memory 34 and bus 36 (with or without the network adapter) is also referred to as a "host computer" or simply "host", for brevity.

Network adapter 38 comprises a network interface 42, which is coupled to communication network 30, and a host interface 44, coupled via bus 36 to CPU 32 and memory 34. Processing circuitry 46, coupled between network interface 42 and host interface 44, generates outgoing packets for transmission over communication network 30 and processes incoming packets received from the communication network, as will be described below.

In the ingress direction, processing circuitry 46 applies to packets received in the network adapter via network interface 42, various processing such as verifying the correctness of the data in the packet payload, packet classification and prioritization, and routing. The processing circuitry typically checks certain fields in the packets' headers for the purpose of packet classification and routing. The header fields contain addressing information, such as source and destination addresses and port numbers, and the underlying network protocol used. In the egress direction, processing circuitry 46 retrieves data for transmission from the host, via host interface 44, packetizes the data into a sequence of packets, and transmits the packets to their destinations over communication network 30.

In the disclosed embodiments, processing circuitry 46 communicates over communication network 30 using work queues 48. The description that follows mainly refers to work queues 48 as Send Queues (SQs) serving for data transmission. Alternatively, e.g., in IB networks, a work queue 48 comprises a Queue-Pair (QP) comprising a Send Queue (SQ) and a Receive Queue (RQ) (not shown). The SQ, or the SQ part of a QP stores Work Requests (WRs) specifying data transmission operations, whereas the RQ part of the QP stores WRs specifying data reception operations. Some WRs may comprise control WRs, e.g., for establishing or terminating a connection. The WRs stored in the work queues are executed by processing circuitry 46.

In using QP terminology, posting a WR specifying a data transmission operation on a QP means that the WR will be posted on the SQ part of that QP.

A WR of a data transfer operation may specify, for example, a buffer 52 in memory 34 serving as a source buffer or destination buffer, and the amount of data to be transferred. In an embodiment, the data transfer operation may comprise a Remote Direct Memory Access (RDMA) operation that accesses memory 34 directly without involving CPU 32.

The description that follows focuses mainly on the egress direction in which the host transmits data to a target, e.g., via the network adapter. In the egress direction the data to be transmitted may reside in a buffer 52.

In some embodiments, to transmit data, processing circuitry 46 retrieves a WR from the relevant SQ and executes the data transmission operation specified in the WR. The processing circuitry transmits the data in one or more packets, wherein the target recipient acknowledges each packet by sending back to the network adapter an Ack notification. When the data transmission completes (e.g., when the network adapter receives an Ack for the last packet), the processing circuitry posts a Completion Queue Element (CQE) on a Completion Queue (CQ) 58 in memory 34. The CQE notifies the host of completing the execution of the corresponding WR. In some embodiments, a single CQE may be indicative of execution completion of one or more WRs.

A Multi-Channel Send Queue (MCSQ) 56 receives WRs from multiple processes 50. The WRs are to be retrieved and executed by network adapter 38 as will be described below. Although FIG. 1 depicts a single MCSQ, in alternative embodiments, multiple MCSQs can also be used.

In the present example, SQs 48, MCSQs 56 and CQs 58 reside in memory 34 of host 24. This, however, in not mandatory. In alternative embodiments, one or more of SQs 48, one or more of MCSQs 56 and/or one or more of CQs 58 may reside in another memory such as a memory (not shown) of network adapter 38.

Client processes 50, (also referred to simply as "clients" for brevity) running on CPU 32, such as processes generated by application software, communicate with peer clients (not shown) running on remote network nodes 28.

In some embodiments, one or more MCSQs 56 serve as communication interfaces for clients 50. Clients 50 may post on a given MCSQ WRs corresponding to multiple different targets, wherein each WR is to be posted on a SQ 48 that connects to the respective target. As will be described in detail below, the processing circuitry retrieves WRs from the MCSQ and distributes the WRs among SQs associated with that MCSQ. The processing circuitry also handles posting CQEs on CQs 58. The host software that interfaces multi-channel communication via a single MCSQ and a common CQ is much more efficient and requires less CPU cycles than in managing by the host multiple SQs and CQs directly.

In some embodiments, CPU 32 comprises a cache memory 60, which typically serves for temporarily storing data required by the CPU. Processing data in the local cache is typically much faster than processing data residing in memory 34. In an embodiment, the cache stores one or more MCSQs, or respective parts of such MCSQs.

In some embodiments, network node 24 comprises a coprocessor such as an accelerator 64. The accelerator may comprise a hardware device implemented, e.g., in a Field-Programmable Gate Array. The accelerator may be used for fast execution of various data processing tasks, on behalf of the CPU, such as data compression/de-compression, data encryption/decryption and the like. In some embodiments, a client 50 communicates with accelerator 64 by posting a WR on MCSQ 56, wherein the WR specifies the accelerator as the target.

In some embodiments, to establish a connection between a client process running on a host and a peer process running on a target, the host sends a connect packet to the target. After the connection has been established, a SQ (48) and a RQ are assigned at the initiator host side and peer RQ and SQ are assigned at the target side. To disconnect a connection, the initiator host sends a disconnect packet to the target.

In some embodiments, SQs 48 may be configured to operate in accordance with a Reliable Connection (RC) protocol or in accordance with a Dynamically Connected (DC) protocol.

In the RC transport service, the connection between the host and the target is persistent, i.e., intended to remain active for a relatively long time. A connection in accordance with the RC protocol is available for communication at any time, and therefore can be used immediately (or with only sort delay) when needed. Since in the RC protocol the connection remains available even when no traffic is exchanged, the RC persistently consumes storage space for the SQs and RQs at both sides. The RC is therefore not well scalable for supporting a large number of simultaneous connections.

In the DC transport service, connections between the host and targets are established on demand. The host (or its network adapter) may hold a pool of SQs that is typically much smaller than a SQ pool of a RC transport service. When the host transmits data to a given target, a SQ is temporarily assigned to connect to this target. When the transfer operation completes, the connection is terminated and the SQ becomes available in the pool for connecting to other targets. The DC transport service is scalable because it uses a relatively small number of shared SQs. A disadvantage of the DC transport service is the latency incurred for connection establishment and termination.

In the disclosed embodiments, a single work queue (e.g., a MCSQ) serves a large number of RC and DC SQs. The SQs consume much less storage space compared to the MCSQ because they need only a small storage space for the transport context and a small amount of storage space for storing information used for accessing WRs in the MCSQ. Such a configuration is especially beneficial when memory and/or cache storage space available for the WR initiator are limited. Interfacing a single MCSQ instead of interfacing many SQs is also advantageous in general, and for WR initiators having limited resources. Examples of WR initiators having limited resources include peer hardware devices (e.g., a FPGA device or GPU), SoC, embedded CPU and the like.

Multi-Channel Management by Network Adapter

Figure 2:
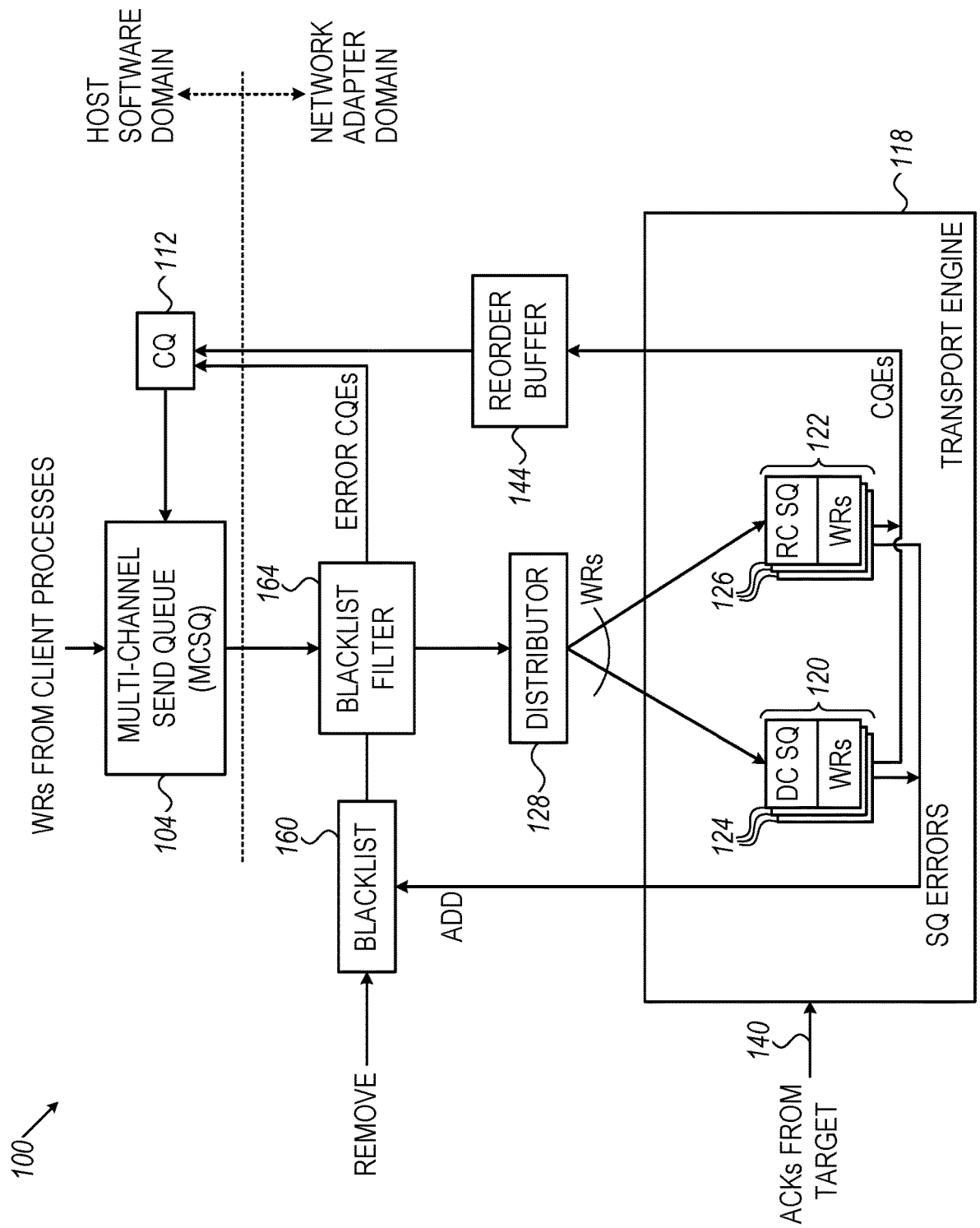
FIG. 2 is a diagram that schematically illustrates data flow in a network node that supports communication over multiple channels, in accordance with an embodiment that is described herein.

FIG. 2 is a diagram that schematically illustrates data flow in a network node 100 that supports communication over multiple channels, in accordance with an embodiment that is described herein.

The data flow within network node 100 will be described with reference to network node 24 of FIG. 1.

In network node 100, multi-channel communication is carried out by combination of software executed by CPU 32 of the host and management of multiple connections by network adapter 38. In FIG. 2, a horizontal dotted line separates between the host software domain and the network adapter domain. In the present context, the software domain and network adapter domain refer to respective processing carried out by CPU 32 and by network adapter 38, respectively. The data structures involved in the processing, such as MCSQs, SQs and CQs, may reside in any suitable memory such as memory 34 or a memory of the network adapter (not shown).

In the example of FIG. 2, elements of the software domain (above the dotted line) comprise a MCSQ 104 for interfacing WRs to the network adapter. Although FIG. 2 depicts a single MCSQ, in alternative embodiments, any other suitable number of MCSQs may be used.

MCSQ 104 receives from clients 50 running on the host WRs specifying data transmission operations. A WR specifying data transmission contains an identifier indicative of a SQ on which to post the WR.

In the RC protocol, a single SQ is used for connecting to a single target, in which case the number assigned to the SQ (e.g., or QP number) can be used as the SQ identifier for that target. In the DC protocol, the same DC SQ is used for connecting to different targets at different times. In this case, the CPU assigns a stream identifier (stream ID) to each WR, which is then posted on a DC SQ serving the relevant stream ID. When no SQ is assigned to the stream ID of the WR, an available DC SQ (if there is one) will be assigned to that stream ID, and the WR will be posted on that DC SQ. If no DC SQ is available for posting the WR, the distributor waits until one of the used DC SQs becomes available. A WR specifying data transmission to a given target will be posted on a DC SQ that serves the relevant stream ID. If this DC SQ is currently serving another target, after serving all of its previously posted WRs, the DC SQ reconnects for serving the given target.

Note that in terms of targets, each of the DC SQs can connect to any desired target. In terms of stream IDs—if there is a DC SQ serving a stream ID, the WR having this stream ID is posted on this DC SQ to guarantee the execution order of different WRs associated with the same stream ID. This applies for WRs destined to the same or different targets.

A CQ 112 receives from the network adapter CQEs indicative of execution completion of WRs posted on MCSQ 104.

A given client 50 may communicate with multiple targets. The clients typically post WRs on the MCSQ in some desired order. For example, a client may post one or more WRs for sending data to a target, before posting one or more additional WRs for sending data to the same or to another target.

Network node 100 comprises a transport engine 118. In the present example, the transport engine comprises a DC SQ pool 120 of DC SQs 124 operating in DC mode, and a RC SQ pool 122 comprising RC SQs 126 operating in RC mode.

A distributor 128 retrieves WRs from MCSQ 104 and posts them on DC SQs 124 and RC SQs 126 as appropriate. In some embodiments, each WR in the MCSQ comprises an identifier indicative of the DC SQ or the RC SQ on which to post that WR. A given DC SQ may serve connections with same or different targets of a common stream ID, at different times. A given RC is typically associated with a given SQ identifier, for example, by a QP number.

In some embodiments, for DC SQs, the distributor holds a mapping table between stream IDs and respective active DC SQs. When a DC SQ completes executing all of its pending WRs, the distributor releases the association between the DC SQ and the stream ID.

In some embodiments, distributor 128 posts WRs of targets of a common stream ID on a same DC SQ. Similarly, distributor 128 may post WRs of targets of a common identifier (QP number) on a same RC SQ. This guaranties that WRs having the same identifier will be executed sequentially in the same order they were posted on the MCSQ.

Transport engine 118 reads WRs from DC SQs 124 and from RC SQs 126 and executes them. In some embodiments, the transport engine executes one WR at a time. In such embodiments, the transport engine selects a DC SQ or a RC SQ from which to execute a WR using any suitable method, e.g., a round robin method or randomly. Alternatively, the transport engine supports executing multiple WRs from multiple SQs in parallel. For example, the transport engine may execute a WR from a DC SQ and a WR from a RC SQ in parallel, and/or execute multiple WRs from multiple DC SQs and/or from multiple RC SQs in parallel.

In executing a WR, transport engine 118 reads data to be transmitted, e.g., from a buffer 52 in memory 34, packetizes the read data into a sequence of packets, and transmits the packets to the relevant target, e.g., over communication network 30. For each packet sent, the transport engine receives an Ack notification 140 from the target. After receiving the Ack for the last packet corresponding to the current WR, the transport engine generates a CQE indicative of the WR execution completion. The transport engine posts the CQE on CQ 112 (for a both DC SQs and RC SQs), which CQs are accessible by the host.

The transport engine executes WRs posted on a DC SQ (or on a RC SQ) in the same order they were posted on the relevant MCSQ, but typically executes WRs posted on different DC SQs (or on different RC SQs) in an order different from their order in the MCSQ. Such an out of order execution may occur for various reasons, such as WRs requiring different execution times, SQs experiencing different workloads and different priorities assigned to different SQs.

In some embodiments, the transport engine supports ordered or unordered execution of WRs by posting CQEs on the CQ in an ordered or unordered manner.

As noted above, the execution order of the WRs typically differs from the order in which the WRs were posted on the MCSQ. In the ordered mode, a reorder buffer 144 orders the CQEs generated by the transport engine, in the same order in which the corresponding WRs were posted on the MCSQ. In the ordered mode, the network adapter posts a CQE corresponding to a given WR only after WRs posted in the MCSQ before the given WR have been executed and their CQEs have been posted on the MCSQ. In an example embodiment, CQE reordering may be based on sequence numbers assigned to the WRs posted on the MCSQ. In the ordered mode, a single CQE may correspond to multiple WRs, which reduces the number of CQEs handled by the host. Consider, for example, posting on the MCSQ three WRs, one WR for each of three connections. In the ordered mode, the network adapter can post a CQE only for the last WR executed among the three posted on the MCSQ.

In the unordered mode, transport engine 118 posts CQEs in the order of WRs completions, which is typically different from the order in which the WRs were posted on the MCSQ. The unordered mode may be used, for example, when the host (e.g., a client 50) does not expect any specific execution order among the WRs. As such, the host may handle a completed WR, without having to wait for previous slower WRs to complete execution.

In DC SQ pool 120, at any given time each of DC SQs 124 may be engaged in a connection or be available for establishing a new connection.

The transport engine may disconnect an engaged DC SQ for which no WRs were submitted for a predefined time, and the disconnected DC SQ becomes available for other connections.

In RC SQ pool 122, a RC SQ 126 is connected to a respective target for a long period of time even when the RC SQ has no WRs submitted for execution.

The multi-channel communication in network node 100 may fail when MCSQ 56 malfunctions, e.g., due to a failure in transferring WRs into or out of the MCSQ. In this case, all multi-channel communication via the failing MCSQ is suspended, in an embodiment.

Multi-channel communication may also fail when a DC SQ or a RC SQ fails, e.g., due to a connection timeout. In this case, in an embodiment, only the failing DC SQ or RC SQ is suspended, while communication via other DC SQs and RC SQs continues uninterrupted.

Note that WRs in a failing SQ are not executed and therefore the transport engine does not generate CQEs for these WRs. This may block execution of WRs in the MCSQ associated with valid connections. In some embodiments, to allow fluent operation of the MCSQ, the network adapter generates CQEs indicative of the failure, and posts them on the CQ. The MCSQ may respond to such CQEs as if the corresponding WRs have been completed.

In an embodiment, the network adapter generates for WRs destined to the failing RC SQ or DC SQ, CQEs indicative of a failing connection, and posts these CQEs on the CQ.

When a RC or DC SQ fails, the identifier that is currently associated with the failing SQ is added to a blacklist 160. The SQ identifier may comprise a QP number for RC or a stream ID for DC. In case of a TCP connection, the SQ identifier may comprise a five-tuple comprising source and destination addresses, source and destination port numbers and an underlying protocol. When distributor 128 reads a WR from MCSQ 104, a blacklist filter 154 checks whether the identifier of the SQ is in blacklist 160. When the identifier is not in the blacklist, the distributer sends the WR to the relevant SQ, as described above. When the identifier is in the blacklist, the blacklist filter refrains from sending the WR to the distributor. Instead, the network adapter generates a CQE indicative of the failing connection and posts the CQE on CQ 112. At a suitable later time, e.g., when the failure is fixed, the host sends to the network adapter a command to remove the SQ identifier from the blacklist.

In the example embodiment of FIG. 2, transport engine 118 executes the WRs in the SQs. For example, the transport engine comprises a single execution engine that executes all the WRs. Alternatively, transport engine comprises multiple execution engines that are dynamically allocated for executing the WRs.

As noted above, the number of MCSQs is not necessarily limited to a single MCSQ. When having multiple MCSQs, a SQ connected to a given target may serve multiple MCSQs.

The computing system (20), network node (24) and network adapter (38) configurations shown in FIG. 1 are example configurations, which are chosen purely for the sake of conceptual clarity. In alternative embodiments, any other suitable computing system, network node and network adapter configurations can also be used. Elements that are not necessary for understanding the principles of the present invention, such as various interfaces, addressing circuits, timing and sequencing circuits and debugging circuits, have been omitted from the figure for clarity.

Some elements of network adapter 38, such as processing circuitry 46, may be implemented in hardware, e.g., in one or more Application-Specific Integrated Circuits (ASICs) or FPGAs. Additionally or alternatively, processing circuitry 46 can be implemented using software, or using a combination of hardware and software elements. Memory 34 may comprise any suitable type of memory using any suitable storage technology such as a Random Access Memory (RAM), a Dynamic RAM (DRAM), a nonvolatile memory such as a Flash memory, or a combination of multiple memory types.

In some embodiments, some of the functions of network adapter 38, e.g., function of processing circuitry 46, may be carried out by a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Methods for Multi-Channel Communication Using DC and RC Protocols

Figure 3:
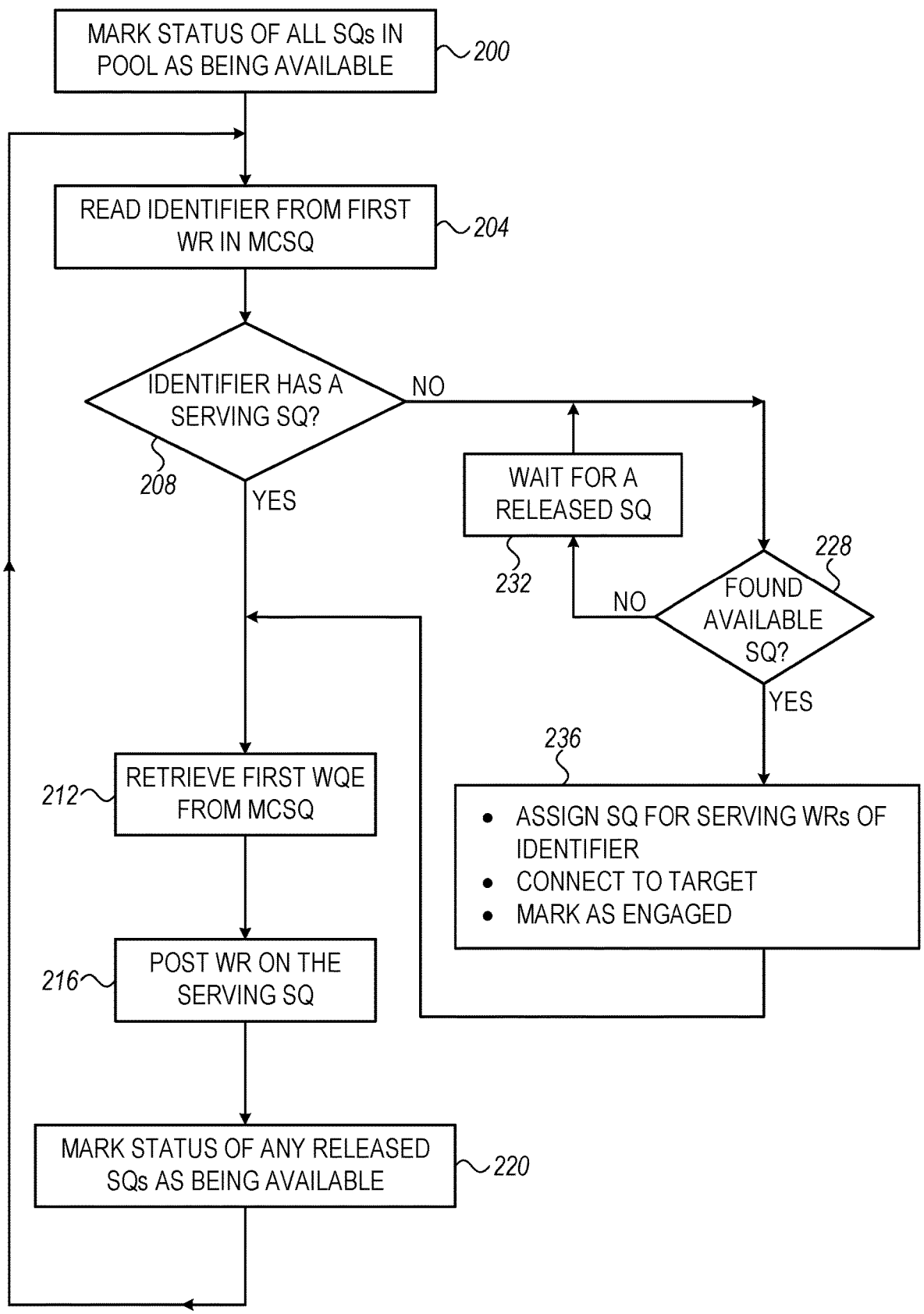
FIG. 3 is a flow chart that schematically illustrates a method for multi-channel transmission, in accordance with an embodiment that is described herein.

FIG. 3 is a flow chart that schematically illustrates a method for multi-channel transmission, in accordance with an embodiment that is described herein.

The method will be described as executed by network adapter 38 of FIG. 1 (more specifically by processing circuitry 46 of the network adapter), and with reference to the diagram in FIG. 2 including elements of the network adapter domain.

In describing the method of FIG. 3, it is assumed that the WR includes an identifier field indicative of a SQ on which the WR is to be posted.

The method begins with network adapter 38 marking a status of all DC SQs 124 in DC SQ pool 120 and of all RC SQs 126 in RC SQ pool 122 as being available, at a SQ initialization step 200. At an identifier determination step 204, the network adapter reads an identifier field from the first WR (e.g., the WR at the head position) in MCSQ 104. The identifier depends on the underlying protocol. For example, when the WR specifies transmission using the DC protocol, the identifier may comprise a stream identifier. Alternatively, when the WR specifies transmission using RC mode, the identifier may comprise a QP number. Further alternatively, when the underlying protocol is the TCP, the identifier may comprise a five-tuple comprising source and destination addresses, source and destination port numbers and an underlying protocol.

At an association query step 208, the network adapter checks whether the identifier has been associated with any of DC SQs 124 or RC SQs 126, and if so, retrieves the first WR from the MCSQ, at a WR retrieval step 212. At a WR posting step 216, the network adapter posts the WR on the serving SQ determined at step 208 above. At a released checking step 220, the network adapter checks whether any SQ has been released, and if so, marks the status of the released SQs as being available. Following step 220 the network adapter loops back to step 204 to process a subsequent WR in MCSQ 104.

When at step 208, the identifier has no associated SQ in the DC SQ pool or in the RC SQ pool, the network adapter proceeds to a SQ availability checking step 228, to check for an available DC SQ in the DC SQ pool or a RC SQ in the RC SQ pool, as required. When at step 228 no available SQ is found, all the SQs in the relevant pool are engaged with connections, and the network adapter proceeds to a waiting step 232, to wait for one (or more) of the DC SQs in the DC SQ pool or one (or more) of the RC SQs in the RC SQ pool to disconnect and become available, and loops back to step 228.

When at step 228 an available SQ is found, the network adapter proceeds to an assignment step 236, to assign the found SQ to serve WRs having the identifier of step 204. Further at step 236, the network adapter establishes a connection between the found SQ and a SQ of the target and marks the status of the found SQ as engaged. Following step 236, the network adapter proceeds to step 212 followed by step 216, to retrieve the current first WR and post it on the SQ assigned at step 236.

Figure 4:
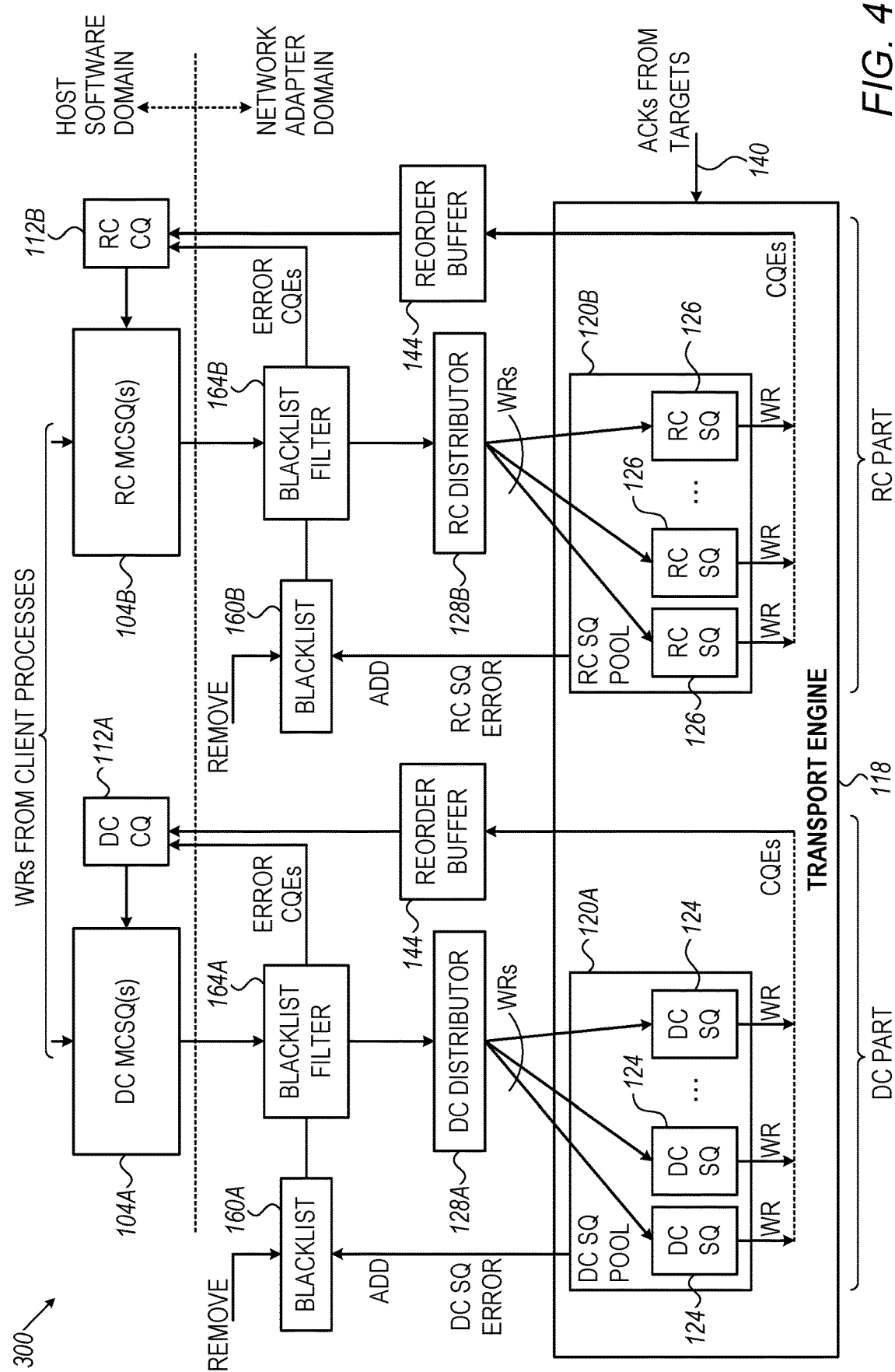
FIG. 4 is a diagram that schematically illustrates data flow in a network node that separately manages communication using DC and RC connections, in accordance with an embodiment that is described herein.

FIG. 4 is a diagram that schematically illustrates data flow in a network node 300 that separately manages communication over DC and RC connections, in accordance with an embodiment that is described herein.

In FIG. 4 WRs for RC and DC are handled separately. The DC part comprises a DC MCSQ 104A (or multiple DC MCSQs), holding WRs that a DC distributor 128A distributes among DC SQs 124. Completion of DC WRs are reported via a DC CQ 112A. The RC part comprises a RC MCSQ 104B (or multiple RC MSCQs), holding WRs that a RC distributor 128B distributes among RC SQs 126. Completion of RC WRs are reported via a RC CQ 112B. The DC and RC parts comprise separate blacklists 160A and 160B and separate blacklist filters 164A and 164B for handling DC SQ failures and RC SQ failures, respectively. Each of the DC part and the RC part comprises a reorder buffer 144 for reordering completion reports.

The data flow in the DC and RC parts using separate MCSQs, is similar to the functionality and data flow described above in FIG. 2 above, in which DC and RC are handled using a common MSCQ.

In some embodiments, the host posts WRs on a first and second MCSQs associated respectively with first and second pools of SQs. Each of the first and second MCSQs may be DC MCSQ or a RC MCSQs. In such embodiments, the network adapter distributes WRs from the first MCSQ to SQs in the first pool and distributes WRs from the second MCSQ to SQs of the second pool. In some embodiments, at least one SQ is shared among the first and second pools (e.g., both are DC SQ pools or both are RC SQ pools), and the network adapter posts WRs from both the first and the second MCSQs to the at least one SQ.

The embodiments described above are given by way of example, and other suitable embodiments can also be used.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network adapter, comprising:
   a network interface, configured to connect to a communication network for communicating with remote targets;
   a host interface configured to connect to a host that accesses a Multi-Channel Send Queue (MCSQ) storing Work Requests (WRs) originating from client processes running on the host; and
   processing circuitry, configured to:
   retrieve WRs from multiple Send Queues (SQs) and execute data transmission operations specified in the WRs, and
   retrieve the WRs from the MCSQ and distribute the retrieved WRs among the multiple Send Queues (SQs) accessible by the processing circuitry.

2. The network adapter according to claim 1, wherein each of the targets comprises (i) a remote node coupled to the communication network or (ii) a local device coupled to the host.

3. The network adapter according to claim 1, wherein the WRs comprise respective identifiers associated with respective SQs, and wherein the processing circuitry is configured to distribute the WRs among the SQs based on the identifiers.

4. The network adapter according to claim 3, wherein the processing circuitry is configured to, in response to detecting that the identifier in a retrieved WR has no associated SQ among the SQs, select an available SQ among the multiple SQs, to associate the identifier with the available SQ, and to post the WR on the available SQ.

5. The network adapter according to claim 3, wherein the processing circuitry is configured to, in response to detecting that the identifier in a given WR is associated with a selected SQ, post the WR on the selected SQ.

6. The network adapter according to claim 1, wherein the processing circuitry is configured to operate the SQs in accordance with a Reliable-Connection (RC) protocol in which the SQs are assigned to connect persistently to respective targets.

7. The network adapter according to claim 1, wherein the processing circuitry is configured to operate the SQs in accordance with a Dynamically Connected (DC) protocol, which allows a given SQ to connect to different targets at different times.

8. The network adapter according to claim 1, wherein the host posts WRs on a first and second MCSQs associated respectively with first and second pools of SQs, and wherein the processing circuitry is configured to distribute WRs from the first MCSQ to SQs in the first pool, and to distribute WRs from the second MCSQ to SQs of the second pool.

9. The network adapter according to claim 8, wherein at least one SQ is shared among the first and second pools, and wherein the processing circuitry is configured to post WRs from both the first and the second MCSQs to the at least one SQ.

10. The network adapter according to claim 1, wherein the processing circuitry is configured to post on a Completion Queue (CQ) accessible by the client processes a Completion Queue Element (CQE) indicative of concluding execution of a given WR, after posting on the CQ all CQEs corresponding to WRs posted to the MCSQ before the given WR.

11. The network adapter according to claim 1, wherein the processing circuitry is configured to post CQEs to a CQ independently of an order of respective WRs in the MCSQ.

12. The network adapter according to claim 1, wherein the processing circuitry is configured to distribute to a given SQ that has established a connection with a given target, only WRs specifying the given target, until the connection terminates.

13. The network adapter according to claim 1, wherein the processing circuitry is configured to, in response to detecting a failure in a given SQ, post on a CQ a CQE indicative of the failure.

14. The network adapter according to claim 13, wherein the processing circuitry is configured to post on the CQ a CQE indicative of the failure for each WR that is to be executed in the given SQ.

15. The network adapter according to claim 13, wherein the processing circuitry is configured to post on the CQ a CQE indicative of the failure for each WR from the MCSQ that is to be distributed to the given SQ.

16. The network adapter according to claim 1, wherein at least a given WR specifies a respective data transmission operation from the host to a target.

17. The network adapter according to claim 1, wherein a given WR specifies a locally executed operation.

18. The network adapter according to claim 1, wherein the Send Queues reside in a memory of the host and the processing circuitry accesses the MCSQ and the SQs through the host interface.

19. The network adapter according to claim 1, wherein the Send Queues reside in a memory of the network adapter.

20. A method for communication, comprising:
in a network adapter that connects to a communication network for communicating with remote targets, and further connects to a host that accesses a MCSQ storing Work Requests (WRs) originating from client processes running on the host,
retrieving WRs from multiple Send Queues (SQs) and executing data transmission operations specified in the WRs, and
retrieving the WRs from the MCSQ and distributing the retrieved WRs among the multiple Send Queues (SQs) accessible by the network adapter.

21. The method according to claim 20, wherein each of the targets comprises (i) a remote node coupled to the communication network or (ii) a local device coupled to the host.

22. The method according to claim 20, wherein the WRs comprise respective identifiers associated with respective SQs, and wherein distributing the WRs comprises distributing the WRs among the SQs based on the identifiers.

23. The method according to claim 22, and comprising, in response to detecting that the identifier in a retrieved WR has no associated SQ among the SQs, selecting an available SQ among the multiple SQs, associating the identifier with the available SQ, and posting the WR on the available SQ.

24. The method according to claim 22, and comprising, in response to detecting that the identifier in a given WR is associated with a selected SQ, posting the WR on the selected SQ.

25. The method according to claim 20, and comprising operating the SQs in accordance with a Reliable-Connection (RC) protocol in which the SQs are assigned to connect persistently to respective targets.

26. The method according to claim 20, and comprising operating the SQs in accordance with a Dynamically Connected (DC) protocol, which allows a given SQ to connect to different targets at different times.

27. The method according to claim 20, wherein the host posts WRs on a first and second MCSQs associated respectively with first and second pools of SQs, and wherein distributing the WRs comprises distributing the WRs from the first MCSQ to SQs in the first pool, and distributing the WRs from the second MCSQ to SQs of the second pool.

28. The method according to claim 27, wherein at least one SQ is shared among the first and second pools, and wherein distributing the WRs comprises posting WRs from both the first and the second MCSQs to the at least one SQ.

29. The method according to claim 20, wherein posting the CQEs comprises posting on a Completion Queue (CQ) accessible by the client processes a Completion Queue Element (CQE) indicative of concluding execution of a given WR, after posting on the CQ all CQEs corresponding to WRs posted to the MCSQ before the given WR.

30. The method according to claim 20, wherein posting the CQEs comprises posting CQEs to a CQ independently of an order of respective WRs in the MCSQ.

31. The method according to claim 20, wherein distributing the WRs comprises distributing to a given SQ that has established a connection with a given target, only WRs specifying the given target, until the connection terminates.

32. The method according to claim 20, wherein posting the CQEs comprises, in response to detecting a failure in a given SQ, posting on a CQ a CQE indicative of the failure for each WR retrieved from the MCSQ and that is to be distributed to the given SQ.

33. The method according to claim 32, wherein posing the CQEs comprises posting on the CQ a CQE indicative of the failure for each WR that is to be executed in the given SQ.

34. The method according to claim 32, wherein posting the CQEs comprises posting on the CQ a CQE indicative of the failure for each WR from the MCSQ that is to be distributed to the given SQ.

35. The method according to claim 20, wherein a given WR specifies a respective data transmission operation from the host to a target.

36. The method according to claim 20, wherein a given WR specifies a locally executed operation.

37. The method according to claim 20, wherein the Send Queues reside in a memory of the host or in a memory of the network adapter.

* * * * *